3,342,736
CORROSION INHIBITOR FOR HYDRAULIC FLUIDS

Robert J. Nankee, Midland, Mich., assignor to The Dow Chemical Company, Midland, Mich., a corporation of Delaware
No Drawing. Filed Feb. 3, 1964, Ser. No. 342,265
6 Claims. (Cl. 252—75)

This invention relates to new corrosion inhibitors and to hydraulic fluids comprising the inhibitors.

In non-aqueous hydraulic fluids, such as automobile brake fluids, shock absorber fluids and functional fluids for the actuation of hydraulically operated machines, numerous stringent and sometimes antagonistic requirements must be met. Thus, such fluids must have adequate viscosity at ordinary temperatures and yet not be solid or unduly viscous at sub-zero temperatures. They should be substantially inert to rubber and non-corrosive to each of the numerous metals commonly used in hydraulic systems. They should be stable and chemically inert under the conditions of use. Because of the increasing complexity of hydraulic machines and the greater variety of metals in such machines, the problem of inhibiting the corrosion of the various metals by the hydraulic fluid in contact therewith is a persistent and increasingly complex one.

Borax has long been a widely used inhibitor for hydraulic fluids, but, due to the water associated therewith, it lowers the boiling point of the fluid. Attempts to use dehydrated borax are stymied by the insolubility of the material in hydraulic fluids. The use of borax has been improved by recent processes wherein it is dissolved in a glycol, the solution is dehydrated, and the product is used as a concentrate for incorporation into hydraulic fluids (U.S. Patents 2,979,524 and 2,982,733).

The use of alkali and alkaline earth metal borates in hydraulic fluids heretofore has been limited to the ortho, meta or tetraborates, i.e., to those salts wherein the ratio of metal equivalents to boron is at least 1:2. Thus, the above salts have the formula $M_3BO_3$, $M_2B_2O_4$ and $M_2B_4O_7$, respectively, wherein M represents one equivalent of an alkali or alkaline earth metal.

According to the present invention, superior non-aqueous hydraulic fluids are obtained by the use in conventional fluids of a corrosion inhibitor which is made by condensing an alkylene glycol with an alkali or alkaline earth metal pentaborate. Such pentaborates have the nominal formula $MB_5O_8 \cdot nH_2O$ wherein M represents one equivalent of the metal and n represents a small integer. It is now believed that the pentaborates actually exist, at least in the crystalline form, as the dimer,

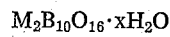
$$M_2B_{10}O_{16} \cdot xH_2O$$

wherein x is usually 10, though it may be 2, 3 or another small integer.

The inhibitors of the invention are conveniently made by condensing the pentaborate salt, preferably the commercial sodium pentaborate decahydrate, with an alkylene glycol. The latter is preferably a glycol which is per se a desirable or at least an unobjectionable component of the finished hydraulic fluid. Thus, the preferred glycols are the vicinal alkylene glycols containing 2 to 6 carbon atoms. While propylene glycol is preferred, ethylene glycol and 1,2- and 2,3-butylene glycol, amylene glycol, hexylene glycol and mixtures thereof can be used. The ratio of glycol to borate used in making the condensate can be varied widely, the practical minimum being that amount of glycol that will readily dissolve the borate and the maximum being that amount that is desired in the final hydraulic fluid when the condensate is put into the fluid. As a practical matter, it is generally preferred to use about 20 to 60 moles of glycol per mole of borate, thus producing an inhibitor concentrate which can be added directly to hydraulic fluids. Alternatively, the hydrated pentaborate salt can be added to the hydraulic fluid containing alkylene glycol and condensed therewith by application of heat and removal of water, suitably by distillation, thus producing the inhibitor in situ. In either method there is produced about 24–25 moles of water per mole of borate when using sodium pentaborate decahydrate, $Na_2B_{10}O_{16} \cdot 10H_2O$, thus indicating a maximum of about 1.5 moles of water of reaction per atom of boron. At least 1.0, and preferably 1.5 moles of water of reaction should be removed.

Although the process can be operated at atmospheric pressure by distilling the water from the reaction mixture, as an aid in removing the water of reaction it is preferred to conduct the condensation reaction under reduced pressure. A convenient pressure is about 50–400 mm., this being such that the glycol boils at about 100–200° C. Thus, by gradually heating the glycol-borate reaction mixture to its boiling point the mixture is rapidly and effectively dehydrated with only insignificant loss of glycol in the distillate. While the temperature of condensation is not critical, it is preferred that it be no more than about 200° C. because of possible incipient decomposition and discoloration. Temperatures below 100° require needlessly long reaction time to effect the condensation reaction. While the above process is preferred, other methods are apparent. Thus, instead of distilling the water of reaction alone it can be azeotropically distilled at atmospheric or other pressure by the addition of a water-azeotroping agent to the reaction mixture. Generally such procedure is undesirable because the most effective azeotroping agents are undesirable in hydraulic fluids and must be removed from the product before the latter is used.

The glycol-borate condensates of the invention are viscous liquids or solid at normal temperatures, depending on the particular glycol used and the glycol-borate ratio therein. All are pourable liquids at elevated temperatures and are readily soluble in alkylene glycols, glycol ethers, polyglycols, lower aliphatic alcohols and other typical components of common hydraulic fluids, as well as in the hydraulic fluids themselves.

PREPARATION OF INHIBITOR CONCENTRATE

Example 1

Four hundred fifty grams of sodium pentaborate decahydrate and 1550 g. of propylene glycol were placed in a reactor fitted with a 1" x 18" Vigreaux column, the pressure was adjusted to 300 mm. absolute and the mixture was gradually heated to boiling. When the vapor temperature at the still head reached 140° C. (pot temperature, 175°) the reaction was terminated by cooling the reactor. During the reaction a total of 364 g. of distillate was collected, of which 352 g. was water, the remainder being glycol.

The product was a hazy liquid which after filtration was clear and almost colorless. It had a pour point of −15° C. and a viscosity at 100° F. of 203 cstks.

Example 2

A reaction mixture consisting of (by weight) 13.95% of sodium pentaborate decahydrate, 83.10% of propylene glycol and 2.95% of aqueous 50% NaOH was reacted as described in Example 1. The product was quite similar in appearance to that of Example 1 and had a viscosity at 100° F. of 121.5 cstks.

Example 3

A mixture consisting of 22.5% by weight of sodium pentaborate decahydrate and 77.5% of ethylene glycol was reacted as described in Example 1. The product was a solid at room temperature which melted at about 40° C.

If desired, a substantial part of the water of hydration of the pentaborate can be removed before the condensation with glycol. Thus, sodium pentaborate decahydrate is readily dehydrated to the trihydrate by heating at 150–200° C. A correspondingly smaller amount of water is evolved when this borate is condensed with a glycol.

PREPARATION OF HYDRAULIC FLUIDS

The borate-glycol condensates of the invention can be used as corrosion inhibitors in any of the common non-aqueous hydraulic fluids by simply dissolving a small but effective amount of the condensate in the fluid. This amount can be varied quite widely. Thus, as little as 0.01% by weight, calculated as boron, effectively reduces metal corrosion, though as much as 0.25% may be desirable in heavy duty fluids. Amounts in excess of 0.25% are effective but uneconomical since the slight added protection is not justified by the added cost. For ordinary automobile brake fluids, about 0.05–0.2% is preferred.

The following formulas are typical examples of hydraulic fluids in which the borate-glycol condensates of the invention are particularly useful. Outstanding corrosion protection of cast iron, steel, copper, brass, tin and aluminum is obtained when 2 to 4% by weight of the condensates of the above examples are added to each of these hydraulic fluids. The corrosion tests were run according to Federal Specification VV-H-910a.

HYDRAULIC FLUID FORMULATIONS

| Component [1] | Percent by Volume | | |
|---|---|---|---|
| | 1 | 2 | 3 |
| Diethylene Glycol | 20 | | |
| Dipropylene Glycol | | 15 | 10 |
| Propylene Glycol Monomethyl Ether | 22 | | |
| Diethylene Glycol Monoethyl Ether | | 65 | 70 |
| Dipropylene Glycol Monomethyl Ether | 27 | | |
| Tripropylene Glycol Monomethyl Ether | 11 | | |
| Polyglycol P-2000 | | 20 | |
| Polyglycol P-4000 | | | 8 |
| Polyglycol 15-200 | 20 | | |
| Polyglycol 233-90 | | | 12 |

[1] Polyglycols P-2000 and P-4000 are polypropylene glycols of average molecular weight 2,000 and 4,000, respectively; Polyglycol 15-200 is the product made by condensing a mixture of 40 moles each of ethylene oxide and propylene oxide with 1 mole of glycerol and has a viscosity at 100° F. of 200 cstks.; Polyglycol 233-90 is the product obtained by the NaOH catalyzed condensation of tall oil with, first, 16.5 moles of propylene oxide and then 5.5 moles of ethylene oxide.

In addition to those set forth above, most other common hydraulic fluids are compatible with and inhibited by the borate-glycol condensates. Thus, fluids may contain castor oil and its derivatives, higher polyalkylene glycols and their mono- and dialkyl ethers as well as their fatty acid esters, and the like.

In addition to the corrosion inhibitor of the invention, hydraulic fluids typically contain one or more antioxidants and may also contain other corrosion inhibitors. Typical antioxidants are bisphenol-A, di-tert.-butylphenol and other phenols and aromatic amines. Suitable supplementary corrosion inhibitors include sodium arsenite, sodium nitrate and sodium mercaptobenzothiazole.

While the borate-glycol condensate usually has ample alkaline reserve for hydraulic fluids under normal use, under exceptional circumstances a higher reserve may be desired. This can be easily attained by the addition of up to about 1.5 moles of alkali metal hydroxide or its equivalent per mole of pentaborate used. This may be added to the final hydraulic fluid, to the condensate after the condensation is complete or the reaction mixture before the condensation is effected. To minimize the water content of the final product it is preferred that the added alkali be condensed with a portion of the glycol or polyglycol or ether thereof to be used in the final fluid and that the water of reaction be removed. This alkali condensate, made separately or in conjunction with the borate condensate, is then incorporated into either the borate condensate or the final hydraulic fluid. In order to avoid any likelihood that the alkali will alter the structure of the pentaborate, it is preferred that the alkali not be added to the borate until the borate-glycol condensate has been formed.

I claim:

1. A condensate of an alkylene glycol containing 2 to 6 carbon atoms and a pentaborate salt of a metal selected from the group consisting of alkali and alkaline earth metals, said condensate being made by heating at about 100–200° C. a mixture of said borate salt with at least about 20 molar equivalents of said alkylene glycol until at least one mole of water of reaction per atom of boron in the borate has been removed.

2. A condensate as defined in claim 1 wherein the metal is an alkali metal.

3. A condensate as defined in claim 1 wherein the metal is sodium.

4. A condensate as defined in claim 1 wherein the glycol is propylene glycol.

5. A corrosion-inhibited hydraulic fluid consisting essentially of a base fluid, and, as a corrosion inhibitor therefor, an effective amount of the condensate defined in claim 1, said base fluid consisting essentially of at least one member of the group consisting of alkylene glycols, alkyl ethers of alkylene glycols, polyglycols, alkyl ethers of polyglycols, fatty acid esters of polyglycols, castor oil and lower alkanols.

6. A fluid as defined in claim 5 wherein the glycol and the borate used in making the inhibitor are propylene glycol and sodium pentaborate, respectively.

References Cited

UNITED STATES PATENTS 2,982,733   5/1961   Wright et al. _____ 252—75

LEON D. ROSDOL, *Primary Examiner.*

SAMUEL H. BLECH, *Examiner.*

S. D. SCHWARTZ, *Assistant Examiner.*